(12) United States Patent
Kanazirev

(10) Patent No.: US 7,790,130 B2
(45) Date of Patent: Sep. 7, 2010

(54) WIDE MESOPOROUS ALUMINA COMPOSITES HAVING TRIMODAL PORE STRUCTURE

(75) Inventor: Vladislav I. Kanazirev, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 159 days.

(21) Appl. No.: 11/848,274

(22) Filed: Aug. 31, 2007

(65) Prior Publication Data

US 2009/0060811 A1 Mar. 5, 2009

(51) Int. Cl.
*B01D 53/14* (2006.01)
*C01B 7/00* (2006.01)

(52) U.S. Cl. .................. 423/240 S; 95/131; 95/132; 210/660; 210/679; 502/414; 502/415; 423/483; 423/488

(58) Field of Classification Search ............. 423/240 S, 423/483, 488; 95/132, 131; 210/660, 679; 502/414, 415
See application file for complete search history.

(56) References Cited

U.S. PATENT DOCUMENTS

| | | | | |
|---|---|---|---|---|
| 3,691,239 A | * | 9/1972 | Hackett et al. | 570/262 |
| 4,001,144 A | | 1/1977 | Pearson et al. | 252/463 |
| 4,140,773 A | | 2/1979 | Stowell et al. | 423/628 |
| 4,179,411 A | | 12/1979 | Broersma et al. | 252/465 |
| 4,301,037 A | | 11/1981 | Sanchez et al. | 252/462 |
| 4,548,709 A | | 10/1985 | Bowes et al. | 208/213 |
| 4,954,469 A | * | 9/1990 | Robinson | 502/80 |
| 5,260,241 A | | 11/1993 | Addiego et al. | 502/60 |
| 5,683,800 A | * | 11/1997 | Stringfield et al. | 428/318.4 |
| 5,897,845 A | | 4/1999 | Denny et al. | 423/210 |
| 6,060,033 A | * | 5/2000 | Cheng | 423/240 S |
| 6,200,544 B1 | | 3/2001 | Blachman | 423/240 |
| 6,403,526 B1 | * | 6/2002 | Lussier et al. | 502/439 |
| 6,589,908 B1 | | 7/2003 | Ginestra et al. | 502/323 |
| 6,685,901 B2 | * | 2/2004 | Hirano et al. | 423/240 S |
| 6,984,310 B2 | | 1/2006 | Ginestra et al. | 208/137 |
| 2003/0159994 A1 | * | 8/2003 | Blachman et al. | 210/660 |

OTHER PUBLICATIONS

The International Union of Pure and Applied Chemistry issued in 1991 (Pure & Appl. Chem., vol. 63, N 9, pp. 1227-1246, 1991).
Preparation of Bimodal Aluminas and Molybdena / Alumina Extrudates by R.E. Tischer published in Journal of Catalysis, vol. 72, pp. 255-265, 1981.

* cited by examiner

*Primary Examiner*—Ngoc-Yen M Nguyen
(74) *Attorney, Agent, or Firm*—Mark Goldberg

(57) ABSTRACT

Wide mesoporous alumina composites are produced by an "in situ reaction" route comprising agglomeration of an alumina powder that is capable of rehydration together with a second reactive powder such as carbonate. In one method of production, the powders are fed to a rotating forming device that is continuously sprayed with liquid under conditions to form particulates. The discharging beads are then subjected to curing and thermal activation to produce the final catalyst or adsorbent. The alumina participates in a pore altering process involving the carbonate component upon formation of hydroxycarbonate intermediates such as Dawsonite. Large fraction of the pore volume of the final product consists of wide mesopores in the 15-50 nanometers range. The alumina composites exhibit a characteristic trimodal pore structure that includes also small micro-meso pores and macropores larger than 200 nanometers.

7 Claims, No Drawings

WIDE MESOPOROUS ALUMINA COMPOSITES HAVING TRIMODAL PORE STRUCTURE

FIELD OF THE INVENTION

The present invention relates to halide scavengers having a trimodal pore size distribution and their use for treating gas and liquid streams. More particularly, the present invention relates to a process of using these halide scavengers for removing HCl from high temperature gas and liquid streams, especially in the production of synthesis gas.

BACKGROUND OF THE INVENTION

The term "porosity" refers to pore space in a material. It can be defined as the fraction of the bulk volume that is occupied by pores or by void space. The individual pores may vary greatly in size and shape within a given solid, and between a given solid and another solid. The width of the pores is commonly assumed to be the diameter of a cylindrical pore, or the distance between the sides of a slit or narrow-shaped pore.

The International Union of Pure and Applied Chemistry issued in 1991 (PURE & APPL. CHEM., Vol 63, N 9, pp 1227-1246, 1991) provides the following recommendations to classify pores according to their size:

Macropores—widths exceeding about 50 nm (nanometers)

Mesopores—widths between 2 and 50 nm

Micropores—smaller than 2 nm

Mercury intrusion appears to be the most popular method to assess the pore distribution in the meso- and macro-region of pore widths whereas physical adsorption is the main method to measure the micro pores. The common principles of porous solid creation include phenomena such as aggregation and agglomeration; re-crystallization; subtraction and addition. For example, porous glasses are prepared by leaching non-porous templates. The porous structure of zeolites, aluminas and silicas can vary with conditions of crystallization and spray drying. Sintering can be also used to change the pore volume of alumina but the BET surface area decreases in such an operation.

The preparation of carbon molecular sieves is an example of pore structure altering by addition. Treating source particles with hydrocarbons at suitable conditions leads to carbon film deposits at the pore mouths causing narrowing the pores.

There are numerous patents related to the pore system of alumina based supports and catalysts. Some of them are listed as follows: U.S. Pat. Nos. 4,001,144; 4,140,773; 4,179,411; 4,301,037; 4,548,709; 5,260,241; 6,403,256; 6,589,908; and 6,984,310.

In these patents, the pore structure of alumina is created or altered by means such as selection of crystallization conditions, presence of seeds, specific extrusion conditions, additives and etc. The paper "Preparation of Bimodal Aluminas and Molybdena/Alumina Extrudates" by R. E. Tischer published in JOURNAL OF CATALYSIS, Vol. 72, pp 255-265, 1981 describes the following methods to produce bimodal pore structure in alumina extrudates: Partial peptization, coextrusion of salt/Boehmite mixtures, and incorporation of combustible fiber such as filter pulp.

The closest prior art to the present invention is described in U.S. Pat. No. 6,403,526 where the alumina is derived from a mixture of Gibbsite (ATH) and active alumina and an additive component is used as well. Another close art is reported in U.S. Pat. No. 4,001,144 where an alumina precursor of chi-rho-eta structure is treated with carbonate or bicarbonate solutions under pressure at about 100° to 160° C. However, the invention described herein is very different from this prior art.

Acid gases are present as impurities in numerous industrial fluids, i.e., liquid and gas streams. These acid gases include hydrogen halides such as HCl, HF, HBr, HI and mixtures thereof. Hydrogen chloride is a problem in particular. Usually, HCl is removed at ambient temperature with alkali metals modified alumina or metal oxide (mostly ZnO) sorbents. On the other hand, high temperature chloride scavengers are needed for some industrial applications such as the production of hydrogen by steam reforming of hydrocarbons. In these applications, the hydrocarbon feed first passes through a hydrodesulfurization (HDS) or hydrogenation stage that converts the organo-chloride contaminants to HCl. Since the HDS process operates at 350° to 400° C., it is advantageous if the next stage of chloride scavenging also occurs at a high temperature.

Use of alumina loaded with alkali metals as an HCl scavenger is the current "state of the art" solution for the purification of hydrocarbon streams at high temperatures. However, the standard zinc oxide based sorbents cannot be applied in such applications because of the volatility of the resulting zinc chloride product.

The existing sorbents for high temperature applications need improvements in terms of chloride loading, reduced reactivity towards the main stream and physical stability in service.

Alumina modified with alkali or alkaline earth elements is known as a good chloride scavenger. Recently, Blachman disclosed in U.S. Pat. No. 6,200,544 an adsorbent for removing HCl from fluid streams comprising activated alumina impregnated with alkali oxide and promoted with phosphates, organic amines or mixtures thereof.

In an attempt to increase the adsorbent performance, U.S. Pat. No. 5,897,845 assigned to ICI claimed absorbent granules comprising an intimate mixture of particles of alumina trihydrate, sodium carbonate or sodium bicarbonate or mixtures thereof and a binder wherein the sodium oxide ($Na_2O$) content is at least 20% by weight calculated on an ignited (900° C.) base. This material was designated for use at temperatures below 150° C.

The present application targets developing alumina particulates with special pore structure suitable for mass-transfer limited applications. A practical and cost effective method to produce such alumina particulates is targeted as well. There are many examples of the positive effect of the presence of large pores in catalysts and adsorbents. Hydrotreatment of petroleum fractions is an appropriate example on the catalyst side while HCl removal from gas and liquid streams illustrates the technical problem to be solved on the adsorbent side. The present application focuses on the latter.

Trace hydrogen chloride contaminates the effluent in major catalytic processes in the hydrocarbon industry such as the UOP processes CCR Reforming and Oleflex. If not removed from the effluent, HCl can cause corrosion and plugging of the equipment and poison sensitive catalysts downstream. Therefore, HCl scavengers are regularly used in the hydrocarbon industry. Alumina modified with alkali, mostly sodium, and alkaline earth, mostly calcium, metals dominates the HCl removal applications. Some other metal oxide or carbonate based materials are also in use.

The plugging of the pore structure with "green oil" produced via side reactions of reactive stream components on the chlorinated scavenger (adsorbent) is a common cause of premature failure of the scavenger. Another cause is the liquid condensation in the pore system especially when two phase flow occurs. In both cases, the efficiency of the material decreases dramatically. Often, replacement with the fresh material only solves the problem.

The special trimodal pore structure provided with this invention best addresses the problems of current industrial HCl scavengers. Moreover, the special pore structure of the alumina is combined with a high concentration of the active component, an alkali metal, which determines the performance potential in HCl removal.

Last, but not least, all this is achieved in a cost effective manner. Generally, HCl in gas or liquid hydrocarbon streams must be removed from such streams to prevent unwanted catalytic reactions and corrosion to process equipment. Furthermore, HCl is considered a hazardous material and the release of HCl to the environment needs to be avoided.

There are currently two main classes of HCl scavengers. The first group comprises the alkali or alkaline-earth doped aluminas. The alkali metal content of these adsorbents calculated as an oxide ($Na_2O$) is typically between 8 and 10%. The scavengers of this group achieve a relatively low Cl loading, typically 7 to 9%. The second group consists of intimate mixtures of alumina, carbonate (bicarbonate) and binder. A typical material from this group is described in U.S. Pat. No. 5,897,845. The $Na_2O$ content is at least 20 mass-%, which determines the high potential Cl loading of this material. However, scavengers of this type cannot be used at temperatures higher than 150° C. They have low BET surface area and insufficient porosity to provide high loading and the inability to function at the high temperatures present in certain applications. For example, in the '845 patent, minimum BET surface area is greater than 10 $m^2/g$ and one commercial product that is intended for high temperature chloride removal has a BET surface area of about 66 $m^2/g$. Accordingly, there remains a need for improved halide scavengers with high loading capacity that can operate at high temperatures, such as above 150° C.

SUMMARY OF THE INVENTION

The invention creates a unique trimodal pore system of alumina adsorbents and catalysts in a cost effective manner. Wide meso pores dominate the pore structure. In the case of Cl adsorbents, the pore forming step is combined with the actual process of introducing the active component and the final agglomeration step to produce properly sized particulates. The final product has high performance in HCl removal combined with low reactivity towards sensitive components in the stream to be purifies. It has also improved resistance towards liquid condensation in the pores—the HCl removal capability remains practically unchanged under harsh condensation conditions.

The composite sorbents prepared according the present invention have significant advantages over the prior art since they are lower cost materials exhibiting high BET surface area and porosity along with a high content of active component. These properties translate to high dynamic capacity in HCl removal from both gas and liquid fluids. A further advantage compared to some other prior art sorbents is that the sorbents of this invention do not require a separate binder to be added to the mixture in the forming process. They have sufficient mechanical stability in both their fresh and spent state along with low reactivity towards the main stream. The invention comprises a process for making an adsorbent and the uses that can be made of this adsorbent. One method of preparation of the adsorbent comprises mixing at least one alumina compound with a solid metal carbonate and adding or spraying water on the mixture. In the practice of the present invention, the term "carbonate" includes inorganic compounds containing a $CO_3$ moiety including a bicarbonate or a basic carbonate. Then the mixture is allowed to stay at ambient conditions to cure or is maintained at an elevated temperature between about 25° and 150° C. for a period long enough for the materials to react. The appropriate combination of reaction time and temperature can be readily determined by one skilled in the art. A longer time is needed at lower temperatures within the stated range. In addition, in the practice of the present invention, a second step of thermal treatment follows the curing step. In this thermal treatment that is a reactive cure, a temperature between 250° and 500° C. is needed in order to compose the material formed in the first step resulting in a reactive species that is useful in scavenging HCl in high temperature applications. Preferably, the temperature is between 320° and 480° C. The sorbent has a BET surface area of from about 50 to 200 $m^2/g$ and typically comprises about 10 to 25 mass-% $Na_2O$. A particularly useful carbonate is a sesquicarbonate. The metal in the metal carbonate may be sodium, potassium, lithium, zinc, nickel, iron or manganese. Other metals may be used as known to those skilled in the art.

The invention also comprises a process for the removal of at least one hydrogen halide from a fluid or gaseous stream comprising hydrogen, hydrocarbons, water, or other gases such as nitrogen and hydrogen halide, wherein said process comprises contacting said fluid stream with a sorbent material in a packed bed, said sorbent material comprising a reaction product of at least one alumina and at least one solid metal carbonate. The solid metal carbonate is preferably at least one sesquicarbonate. The hydrogen halide is selected from the group consisting of hydrogen chloride, hydrogen fluoride, hydrogen iodide, hydrogen bromide and mixtures thereof. The invention is useful in the treatment of a fluid stream comprising a net hydrogen stream from a catalytic reforming process, where the hydrogen halide is hydrogen chloride. The invention is also useful in the treatment of a net hydrogen stream from a light paraffin dehydrogenation process where the hydrogen halide is also hydrogen chloride.

DETAILED DESCRIPTION OF THE INVENTION

At least two solid and one liquid component are needed to produce the reactive composite sorbent of the present invention. At least one carbonate powder and at least one alumina powder comprise the solid components and water or an aqueous solution of at least one salt is the liquid component.

The carbonate powder is preferably an alkali metal carbonate in a powder form. Small particles, preferably about 5 to 10 microns in diameter, are employed. A carbonate component that has been found to provide excellent results in the present invention is the natural carbonate (soda ash) ore known as Trona or Nahcolite. A popular source of such natural carbonate is the Green River occurrence in Wyoming, US. The book NATURAL SODA ASH: OCCURRENCES, PROCESSING AND USE, authored by Donald E. Garrett, Van Nostrand Reinhold publication, 1992, summarizes important characteristics of natural carbonates. Other carbonates that can be used include Wegscheiderite ($Na_2CO_3.NaHCO_3$), Thermonatrite ($Na_2CO_3H_2O$), Shortite ($Na_2CO_3.2CaCO_3$), and Eitelite ($Na_2CO_3.MgCO_3$).

One such carbonate that has been found especially useful is a natural sodium sesquicarbonate, marketed by Solvay Chemicals, Houston, Tex. as Solvay T-200®. A sesquicarbonate has a formula of $Na_2CO_3.NaHCO_3.2H_2O$. It produces 1.5 mols sodium carbonate ($Na_2CO_3$) upon heating at sufficiently high temperature. Table 1 presents some properties of this product as reflected in the producer's technical data sheet.

TABLE 1

| Component | Typical Analysis |
|---|---|
| $Na_2CO_3 \cdot NaHCO_3 \cdot 2H_2O$ | 97.5% |
| Free Moisture | 0.01 |
| Water Insoluble | 2.3% |

TABLE 1-continued

| | |
|---|---|
| NaCl | 0.1 |
| Bulk Density | 785 kg/m³ (49.0 lbs/ft³) |

| Particle Size | |
|---|---|
| Sieve Opening, micrometers | Weight Percent |
| <70 | 75 |
| <28 | 50 |
| 6 | 10 |

The carbonate raw material was found to have a typical FTIR (Fourier Transform Infrared) spectrum characterized with absorbance peaks at about 3464, 3057, 1697, 1463, 1190, 1014, 850 and 602 cm$^{-1}$, corresponding to the values published for this material. The final product of the present invention had an FTIR spectra exhibiting at least two peaks selected from absorbance peaks at 880, 1103, 1454, 1410, 1395, 1570, and 1587 cm$^{-1}$.

An alumina powder that has been found to be useful in the present invention is a transition alumina powder produced by the rapid calcination of Al(OH)$_3$, known as Gibbsite. Alumina A-300, sold by UOP LLC, Des Plaines, Ill., is a typical commercial product that is suitable as a component of the reactive composite of the present invention. This alumina powder has a BET surface area of about 300 m²/g and about 0.3 mass-% Na$_2$O. It contains only a few percent free moisture and is capable of fast rehydration in the presence of water. The FTIR spectrum of A-300 has the broad absorbance peaks due to Al—O vibration at about 746 and 580 cm$^{-1}$, with only a few additional peaks of OH (3502 and 1637 cm$^{-1}$) and CO$_3$ of surface carbonate species (1396 and 1521 cm$^{-1}$) are present.

The third component is water, or optionally an aqueous solution of a salt, which plays an important role in facilitating a reaction between the carbonate and alumina powder. The preferred salts include metal salt is selected from the group consisting of sodium acetate, sodium oxalate and sodium formate. The preferred average particle size D50 for the alumina component and the carbonate ingredient is from about 5 to 12 μm, although larger particles may be used, especially for the carbonate ingredient. The alumina and the sesquicarbonate are present in a ratio of about 0.8 to about 5. Preferably, the alumina and the sesquicarbonate are present in a ratio of about 2 to 4.

It has been found that that there is no reaction between the sesquicarbonate and alumina when a mixture is heated in a dry state to about 100° C. However, heating the dry mix to an initial temperature of from about 300° to about 600° C. converts the sesquicarbonate to sodium carbonate. In contrast, the presence of additional water followed by brief calcination at 100° C. triggers a reaction between the sesquicarbonate and alumina. The product was found to have the structure of Dawsonite crystals with a particle size of less than about 0.02 micrometers. In the present invention, thermal treatment at temperatures from at least 250° up to about 500° C. has been found to produce an adsorbent that is very effective in removal of acid halides at high temperatures. Preferably, this thermal treatment or reactive cure is at a temperature that is equal to or exceeds the temperature that the sorbent is decided to operate at in removal of acid halides. Example 1 describes the process to produce this phenomenon.

EXAMPLE 1

An industrial disk nodulizer was operated continuously at standard conditions for forming beads by delivering about 0.65 parts powder mix consisting of A-300 alumina and Solvay T-200® carbonate and about 0.35 parts water. The powder and water parts are expressed as the mass flows into the nodulizer. The whole system was operated in the regime of forming alumina beads of 5×8 mesh as the primary size.

The content level of Solvay T-200® carbonate was adjusted to obtain about 10.5 mass-% Na$_2$O concentration in the final material. The discharging flow from the nodulizer was directed via a heated belt to a curing bin and subsequently to a moving bed activator where the beads were heated at about 400° C. The final material then was designated as Sample A.

EXAMPLE 2

The conditions of Example 1 were used wherein the carbonate (Solvay T-200®) content of the powder feed was maintained at a level to produce about 12.5 mass-% Na$_2$O in the final product. The material was designated as Sample B.

EXAMPLE 3

The conditions of Example 1 were used whereas the carbonate (Solvay T-200®) content of the powder feed was maintained at a level to produce about 12 mass-% Na$_2$O in the final product. The material was designated as Sample C.

EXAMPLE 4

In this comparison example, a traditional sodium containing alumina for HCl removal applications was produced according to the established procedure in the industrial scale nodulizer. Most of the sodium in the final material was supplied in liquid form as sodium acetate. The manufacturing included also curing and activation steps at similar conditions as Examples 1-3. The final material was designated as Sample D. It contained about 7.5 mass-% Na$_2$O.

EXAMPLE 5

This was a commercial silica alumina for comparison. It is designated as Sample E.

EXAMPLE 6

This was a commercial alumina adsorbent used mainly as a desiccant. It is designated as Sample F.

An examination of the materials produced according the present invention (Samples A-C) found that the samples had most of their pore volume included in a wide mesopore range from about 15 to about 50 nanometers.

The differential pore distribution of all materials prepared according the invention (Samples A-C) exhibited a specific pore range of wide mesopores. As a matter of fact, these materials posses a trimodal pore distribution while the other samples have a typical bimodal pore distribution consisting of large macro pores formed by packing of the primary particles and small pores due mostly to the internal porosity of the particles. The Hg intrusion technique was used to measure the pore distribution of the sample. This technique can be also used to estimate the surface area included in the different pore ranges assuming that all pores have a cylindrical shape. A remarkable feature of the samples of the present invention is that they create much larger surface area in the important pore range between about 15 and 50 nm than all other samples.

TABLE 2

| Sample | Type | Class | Hg pore volume cc/g | % in pores 15-50 nm. | % above 50 nm |
|---|---|---|---|---|---|
| A | Alumina composite | Invention | 0.347 | 40 | 30 |
| B | Alumina composite | Invention | 0.333 | 36 | 39 |
| C | Alumina composite | Invention | 0.346 | 49 | 30 |
| D | Modified alumina | Commercial | 0.365 | 7 | 42 |
| E | Silica-alumina | Commercial | 0.162 | 8 | 57 |
| F | Alumina desiccant | Commercial | 0.29 | 13 | 21 |

Table 2 shows that the samples according to invention exhibit very high percentage of pores between 15 and 50 nanometers while still have sufficient macropores above 50 nm.

Table 3 summarizes the data with respect of the surface area of the samples. It is known that phenomena such as adsorption and catalysis are very much surface dependant. However, it is not sufficient just to have high surface area but also this surface area to be located in accessible sites. Narrow pores may sometimes cause mass transfer problems especially with two phase flow and conditions for liquid condensation.

TABLE 3

| Sample | Type | Class | BET surface area m²/g | Hg intrusion surface area m²/g | Ratio Hg surface area/BET surface area | % Hg surface area in pores larger than 15 nm |
|---|---|---|---|---|---|---|
| A | Alumina composite | Invention | 176 | 89 | 0.51 | 25 |
| B | Alumina composite | Invention | 169 | 74 | 0.44 | 27 |
| C | Alumina composite | Invention | 183 | 77 | 0.42 | 34 |
| D | Modified alumina | Commercial | 195 | 127 | 0.65 | 6 |
| E | Silica-alumina | Commercial | 670 | 44 | 0.07 | 7 |
| F | Alumina desiccant | Commercial | 350 | 145 | 0.41 | 1 |

Since mercury does not penetrate pores smaller than about 3.7 nanometers and the BET does not count the large pores, the ratio of the Hg and $N_2$ derived surface area should give a rough approximation about the proportion of large pores (both meso- and macro) in a porous solid. All the solids in Table 3, except Sorbead that is known as microporous, have similar different ratios of Hg versus BET derived surface area. These ratios range between 0.41 and 0.65 and between 0.42 and 0.51 for the samples according to the invention.

However, the last column in Table 3 reveals the most important difference between the samples. The materials of the invention have a large portion (25-34%) of the Hg accessed surface area incorporated in pores larger than 15 nanometers. This percent is between 1 and 7 in the comparison samples in Table 3. The data above illustrate the unique properties of the invented materials.

The pore structure revealed in this invention may be useful for certain applications such as HCl removal from gas stream at conditions of liquid condensation. A flow reactor loaded with about 55 cc representative sample of the traditional material—Sample D or the invented material—Samples A-C were purged with $N_2$ gas containing about 1 vol-% HCl. In a second run with each material, the sample was first soaked in gasoline and the same procedure as in "dry" conditions was repeated. The presence of liquid did not affect the HCl breakthrough time of Samples A-C while the performance of the reference Sample D was substantially diminished at the same test conditions. A calibrated alkali solution was used in all cases to detect the HCl breakthrough.

A cost effective way to practice the invention was described above. Other approaches are feasible as long as there are proper conditions for the alumina—carbonate reaction to occur. Beside sodium, ammonium, potassium and lithium are known to form Dawsonite—type hydroxyl carbonates upon reaction with alumina. The ammonium is especially useful in the case of catalyst base where excess alkali metal is not desired.

Although not illustrated here, there is a possibility that other elements such as alkaline earth elements and even transitional metals may react with rehydratable alumina at proper conditions. Such reactions are expected to produce hydrotalcite type intermediates and, hence, cause favorable changes in the pore distribution upon agglomeration and subsequent activation.

The invention claimed is:

1. A process for the removal of at least one hydrogen halide from a gaseous or liquid stream comprising hydrocarbons or a product stream of a synthesis gas reaction wherein said process comprises contacting said gaseous or liquid stream with a sorbent material, wherein said sorbent material exhibits a trimodal pore distributions with 40-49% of pores are between 15 and 50 nm and said sorbent material comprises an alumina.

2. The process of claim 1 wherein said hydrogen halide is selected from the group consisting of hydrogen chloride, hydrogen fluoride, hydrogen iodide, hydrogen bromide and mixtures thereof.

3. The process of claim 1 wherein said sorbent material that exhibits a trimodal pore distribution was prepared by an alkali metal carbonate and an alumina powder being mixed with water or an aqueous solution of a metal salt and then activated at a temperature between about 250° and 500° C.

4. The process of claim 3 wherein said sorbent material is activated at a temperature from about 320° to 480° C.

5. The process of claim 1 wherein said sorbent material was prepared with a hydroxycarbonate.

6. The process of claim 1 wherein said sorbent material was prepared with a sesquicarbonate compound.

7. The process of claim 1 wherein said sorbent has a BET surface area from about 50 to 200 m²/g and comprises about 10 to 25 mass-% $Na_2O$.

* * * * *